United States Patent [19]

Konrad et al.

[11] Patent Number: 4,728,703
[45] Date of Patent: Mar. 1, 1988

[54] PREPARATION OF HOMOPOLYMERS AND COPOLYMERS OF ETHENE BY PHILLIPS CATALYSIS

[75] Inventors: Rainer Konrad, Altrip; Volker Warzelhan, Weisenheim; Hans Gropper, Ludwigshafen; Guenther Schweier, Friedelsheim, all of Fed. Rep. of Germany

[73] Assignee: BASF Aktiengesellschaft, Ludwigshafen, Fed. Rep. of Germany

[21] Appl. No.: 28,651

[22] Filed: Mar. 20, 1987

[30] Foreign Application Priority Data

Mar. 22, 1986 [DE] Fed. Rep. of Germany ....... 3609828

[51] Int. Cl.$^4$ ............................ C08F 2/24; C08F 10/02
[52] U.S. Cl. ............................ 526/105; 502/113; 526/106; 526/352
[58] Field of Search ........................... 526/105, 106

[56] References Cited

U.S. PATENT DOCUMENTS

| | | | |
|---|---|---|---|
| 4,011,382 | 3/1977 | Levine et al. | 526/106 |
| 4,016,343 | 4/1977 | Hoff et al. | 526/106 |
| 4,041,224 | 8/1977 | Hoff et al. | 526/106 |
| 4,101,445 | 7/1978 | Levine et al. | 526/106 |
| 4,368,302 | 1/1983 | Downs | 526/105 |

FOREIGN PATENT DOCUMENTS

| | | |
|---|---|---|
| 141893 | 11/1979 | Japan . |
| 49605 | 3/1982 | Japan . |
| 1391771 | 4/1975 | United Kingdom . |
| 2073761 | 10/1981 | United Kingdom . |

Primary Examiner—Edward J. Smith
Attorney, Agent, or Firm—Keil & Weinkauf

[57] ABSTRACT

Ethene polymers are prepared by Phillips catalysis using (1) a supported catalyst which is loaded with chromium and titanium and (2) a co-catalyst, (1) having been obtained by preparing (1.1) a chromium- and titanium-loaded catalyst intermediate from (1.1.a) a silicate carrier material, (1.1.b) a selected chromium compound and (1.1.c) a selected titanium compound and then (1.2) heating said catalyst intermediate in an oxygen-containing gas stream, the (1) used having been obtained by, in general terms, (1.1) preparing in the first stage (1.1.1) a suspension from (1.1.1.1) a finely divided silicate carrier material and (1.1.1.2) a liquid alkane, (1.1.2) then (1.1.2.1) combining the suspension resulting from (1.1.1.) with (1.1.2.2.) a finely divided chromium trioxide, (1.1.3) thereupon (1.1.3.1) combining the suspension obtained from (1.1.2) with (1.1.3.2) an alkanol, (1.1.4) thereafter (1.1.4.1) combining the suspension formed in (1.1.3) with (1.1.4.2) a titanium compound of the formula Ti(OR)$_4$, where R is alkyl, aryl or cycloalkyl, and (1.1.5) finally evaporating the suspension obtained in (1.1.4) to dryness, and then (1.2) in the second stage first (1.2.1) treating the catalyst intermediate obtained in the first state (1.1) with a nitrogen stream, thereupon (1.2.2) heating the intermediate obtained in (1.2.1) in an oxygen-containing gas stream, and finally (1.2.3) treating the intermediate obtained in (1.2.2) with a nitrogen stream; and as (2) with an alkyllithium.

1 Claim, No Drawings

PREPARATION OF HOMOPOLYMERS AND COPOLYMERS OF ETHENE BY PHILLIPS CATALYSIS

The present invention relates to a process for preparing ethene homopolymers and ethene copolymers with minor amounts of copolymerized $C_3$–$C_{12}$-α-monoalkenes, in particular $C_3$–$C_8$-α-monoalkenes, by polymerizing the monomer(s) at from 30° to 150° C., in particular from 60° to 120° C., and from 2 to 150 bar, in particular from 5 to 60 bar, by Phillips catalysis using
(1) a supported catalyst on a carrier material which is loaded with chromium in oxide form and with titanium in oxide form and
(2) a cocatalyst,
the supported catalyst (1) having been obtained by
(1.1) preparing in a first stage a catalyst intermediate (1.1) loaded with desired amounts of chromium and titanium from
(1.1.a) a finely divided porous silicate carrier material,
(1.1.b) a selected, specific chromium compound and
(1.1.c) a selected, specific titanium compound,
and then
(1.2) in a second stage maintaining the catalyst intermediate (1.1) obtained in the first stage at from 300° to 900° C., in particular from 400° to 600° C., in an anhydrous gas stream which contains oxygen in a concentration of over 10% by volume for from 10 to 1,000, in particular from 60 to 300, minutes and through this calcination or activation converting it into the actual supported catalyst (1).

Polymerization processes of this generic type are known, representative examples being in the present context those described in Japanese Preliminary Published Application Nos. 141,893/1979 and 49,605/1982.

It is a characteristic feature of those processes that, in the preparation of the intermediate of the supported catalyst used, first a selected organochromium and a selected organotitanium compound are chemically reacted with each other in a solvent and the resulting reaction product is then loaded onto the carrier material.

Other noteworthy polymerization processes in the given context are for example those described in British Pat. No. 1,391,771 and U.S. Pat. No. 4,368,302.

The essential feature of these processes is that, with the supported catalysts used, the titanium compound is introduced in the preparation of a catalyst intermediate by combining said titanium compound with a carrier material which has previously been loaded with the chromium component.

In the given context, finally, interest must also focus on polymerization processes of a related but different generic type, of which representative descriptions can be found for example in British Patent No. 2,073,761 and U.S. Pat. No. 4,016,343.

It is a significant feature of this process that the supported catalysts used are prepared by first loading the carrier material with the titanium compound and subjecting the resulting intermediate to an oxidative heat treatment, i.e. to a calcination, then loading the resulting intermediate with the chromium compound and again calcining the product.

The polymerization processes dealt with above have at their heart a special form of Phillips catalysis using a supported catalyst which contains not only chromium in oxide form but also titanium in oxide form, the presence of the latter being responsible for the fact that the polymers obtained have a wider molecular weight distribution and thus are preferably suitable for certain areas of use, for example blow molding.

It is true that the existing polymerization processes of the type in question produce polymers having a wide molecular weight distribution; but frequently this distribution is not as wide as desired and/or the polymers produced have unsatisfactory morphological properties, for example a high content of dustlike particles.

It is an object of the present invention to provide a process of the type defined at the beginning which is completely or substantially free of the aforedescribed disadvantage.

We have found that this object is achieved in the polymerization process in question
(1) by using a supported catalyst obtained by, in general terms, (1.1) preparing in the first stage (1.1.1) from (1.1.1.1) a finely divided silicate carrier material and (1.1.1.2) a liquid alkane a suspension, (1.1.2) then (1.1.2.1) combining the suspension resulting from (1.1.1) with (1.1.2.2) a finely divided chromium trioxide, (1.1.3) thereupon (1.1.3.1) combining the suspension obtained from (1.1.2) with (1.1.3.2) an alkanol, (1.1.4) thereafter (1.1.4.1) combining the suspension formed in (1.1.3) with (1.1.4.2) a titanium compound of the formula $Ti(OR)_4$, where R is alkyl, aryl or cycloalkyl, and (1.1.5) finally evaporating the suspension obtained in (1.1.4) to dryness, and then (1.2) in the second stage first (1.2.1) treating the catalyst intermediate obtained in the first stage (1.1) with a nitrogen stream, thereupon (1.2.2) heating the intermediate obtained in (1.2.1) in an oxygen-containing gas stream, and finally (1.2.3) treating the intermediate obtained in (1.2.2) with a nitrogen stream, and
(2) using an alkyllithium as cocatalyst.

The present invention accordingly provides a process for preparing ethene homopolymers and ethene copolymers with minor amounts of copolymerized $C_3$–$C_{12}$-60-monoalkenes, in particular $C_3$–$C_8$-60-monoalkenes, by polymerizing the monomer(s) at from 30° to 150° C., in particular from 60° to 120° C., and from 2 to 150 bar, in particular from 5 to 60 bar, by Phillips catalysis using
(1) a supported catalyst composed of a carrier material which is loaded with chromium in oxide form and titanium in oxide form and
(2) a cocatalyst,
the supported catalyst (1) having been obtained by
(1.1) preparing in a first stage a catalyst intermediate (1.1) loaded with desired amounts of chromium and titanium from
(1.1.a) a finely divided porous silicate carrier material,
(1.1.b) a selected, specific chromium compound and
(1.1.c) a selected, specific titanium compound
and then
(1.2) in a second stage maintaining the catalyst intermediate (1.1) obtained in the first stage at from 300° to 900° C., in particular from 400° to 600° C., in an anhydrous gas stream which contains oxygen in a concentration of over 10% by volume for from 10 to 1,000, in particular from 60 to 300, minutes and through this calcination or activation converting it into the actual supported catalyst (1).

The process according to the invention comprises
(1) using a supported catalyst obtained by
(1.1) preparing in a first stage a catalyst intermediate by first
(1.1.1) preparing in a first substage a suspension from (1.1.1.1) a finely divided porous silicate carrier material which has a particle diameter of 1 to 400 μm, preferably from 10 to 200 μm, a pore volume of from 0.5 to 3 cm$^3$/g, preferably from 1 to 2.5 cm$^3$/g, and a surface area of from 100 to 1,000 m$^2$/g, preferably from 200 to 700 m$^2$/g, and (1.1.1.2) a $C_5$–$C_8$-alkane, preferably a $C_6$–$C_7$-alkane, which is present in liquid form with thorough mixing, subject to the proviso that for every 100 parts by weight of carrier material (1.1.1.1), from 150 to 5,000, preferably from 200 to 1,000, parts by weight of alkane (1.1.1.2) are present, then (1.1.2) in a second substage
(1.1.2.1) combining the suspension resulting from substage (1.1.1) with
(1.1.2.2) a finely divided chromium trioxide ($CrO_3$) having a particle diameter of less than 2,000 μm, preferably less than 500 μm, with further thorough mixing, subject to the proviso that, for every 100 parts by weight of carrier material (1.1.1.1), from 0.1 to 5, preferably from 0.5 to 2, parts by weight of chromium are present from chromium trioxide (1.1.2.2), thereupon
(1.1.3) in a third substage
(1.1.3.1) combining the suspension obtained from substage (1.1.2) with
(1.1.3.2) a $C_3$–$C_{10}$-alkanol, preferably $C_4$–$C_6$-alkanol, and in particular t-butanol, with continued thorough mixing at from 0° to 60° C., preferably from 10° to 30° C., subject to the proviso that, for every 100 parts by weight of carrier material (1.1.1.1), from 3 to 30, preferably from 5 to 15, parts by weight of alkanol (1.1.3.2) are present, and maintaining the whole at said temperature for from 10 to 300, preferably from 30 to 60, minutes, thereafter
(1.1.4) in a fourth substage
(1.1.4.1) combining the suspension formed in substage (1.1.3) with
(1.1.4.2) a titanium compound of the formula Ti(OR)$_4$, where R is $C_1$–$C_{12}$-alkyl, aryl or cycloalkyl, preferably $C_2$–$C_4$-alkyl, and in particular isopropyl, with uninterrupted thorough mixing at from 0° to 60° C., preferably from 10° to 30° C., subject to the proviso that, for every 100 parts by weight of carrier material (1.1.1.1), from 0.1 to 10, preferably from 1 to 6, parts by weight of titanium are present from titanium compound (1.1.4.2), and maintaining the whole at said temperature for from 5 to 300, preferably from 20 to 60, minutes, finally
(1.1.5) in a fifth substage evaporating the suspension obtained in substage (1.1.4) to dryness at not more than 150° C., preferably not more than 80° C., with or without reduced pressure,
and then
(1.2) in a second stage converting the catalyst intermediate obtained from the first stage (1.1) into the actual supported catalyst by first
(1.2.1) in a first substage maintaining the catalyst intermediate obtained from the first stage (1.1) at from 150° to 300° C., in particular from 200° to 270° C., in an anhydrous nitrogen stream for from 60 to 500, in particular from 100 to 300, minutes, thereupon
(1.2.2) in a second substage maintaining the intermediate obtained from substage (1.2.1) at from 300° to 900° C., in particular from 400° to 600° C., in an anhydrous gas stream which contains oxygen in a concentration of over 10% by volume for from 10 to 1,000, in particular from 60 to 300, minutes, and finally
(1.2.3) in a third substage maintaining the intermediate from substage (1.2.2) at from 50° to 400° C., in particular from 100° to 270° C., in an anhydrous nitrogen stream for from 10 to 300, in particular from 30 to 150, minutes,
and
(2) using as cocatalyst an alkyllithium of the formula LiR$^1$, where R$^1$ is $C_1$–$C_{12}$-alkyl, in particular $C_2$–$C_4$-alkyl, subject to the proviso that the atomic ratio of chromium in supported catalyst (1):lithium in cocatalyst (2) is greater than 1:100 and in particular ranges from 1:1 to 1:20.

In what follows, the polymerization process according to the invention is considered as a whole:

The polymerization process as such can be carried into practice with all the features of the invention in virtually any technological embodiment customary in the art, for example as a batchwise, semibatchwise or continuous process, examples thereof being suspension polymerization or dry phase polymerization in a stirred or fluidized bed. The technological embodiments mentioned, in other words the technological variants of the Phillips polymerization of olefins, are wellknown from theory and practice, so that this aspect requires no further comment.

It is to be noted, however, that the procedure according to the invention is preferably carried out as part of a process for the continuous preparation of particulate homopolymers or copolymers by polymerization of the monomer(s) in a $C_4$–$C_5$-alkane present in liquid form as reaction medium, in which the monomer or monomer mixture to be polymerized is present in dissolved form and the particulate polymer formed in suspended form, in the presence or absence of an antistat as an antifouling agent and in the presence or absence of hydrogen as a molecular weight regulant, by circulating the reaction mixture as a cycle stream to which the starting materials are added and from which the particulate polymer is removed. Polymerization processes of this generic type, ie. processes for preparing homopolymers and copolymers of ethylene by suspension polymerization of the monomer(s) in an alkane present in liquid form, are known in many and varied embodiments; attention may be drawn in this context to the procedures described in British Pat. No. 841,263 and 1,435,965 and U.S. Pat. Nos. 3,242,150 and 4,007,321 by way of example.

It is also to be noted that the novel supported catalyst (1), like corresponding known catalysts, can for example be brought together with cocatalyst (2) outside or inside the polymerization space; in the latter case for example through spatially separate introduction of the components, which, incidentally, may be handled in the form of a suspension (catalyst) or solution (cocatalyst).

Finally, it may also be mentioned that the novel polymerization process is predominantly suitable for preparing such ethene homopolymers and ethene copolymers, the latter in particular with propene, but-1-ene, hex-1-ene, 4-methylpent-1-ene or oct-1-ene, as should have an average melt flow index and a wide molecular weight distribution coupled with a low proportion of finely divided polymer, ie. polymers as are preferably used for example in blowmolding. In the novel polymerization process, regulation of the molecular weights of the polymers can be successfully effected by means of molecular weight regulants, in particular hydrogen.

The following remarks are directed to the novel supported catalyst (1) itself:

It is prepared in two stages which, heretofore and hereinafter, are designated (1.1) and (1.2).

In the first stage (1.1), the catalyst intermediate is prepared via five substages (1.1.1), (1.1.2), (1.1.3), (1.1.4) and (1.1.5), which are easy and simple to carry into practice, expediently in an apparatus which permits uninterrupted, ideally homogeneous mixing of the respective batches under an inert protective atmosphere, such as nitrogen. Furthermore, in substages (1.1.3) and (1.1.4) the alkanol (1.1.3.2) and the titanium compound (1.1.4.2) are expediently not added all at once, but, rather, are gradually introduced into the respective suspension (1.1.3.1) or (1.1.4.1). Finally, the evaporating process in substage (1.1.5) is ideally constructed to be gentle, for example by resorting to a rotary evaporator.

In the second stage (1.2), the catalyst intermediate obtained from the first stage (1.1) is converted in the course of three substages (1.2.1), (1.2.2) and (1.2.3) into the actual supported catalyst. Again these process steps are easy and simple to carry into practice. Expedient apparatuses and working methods for this purpose are the conventional and wellknown ones for calcining (or activating) Phillips supported catalysts. The conditions chosen for the second substage (1.2.2) should be such as to ensure that in the completed supported catalyst the chromium at least part thereof, be present in no state other than hexavalent state; in this respect there is thus no difference here from the prior art. The special inventive features of the second stage (1.2) rather reside in the additional upstream and downstream substages (1.2.1) and (1.2.3) without which the object of the invention is not achievable. As regards the latter substage (1.2.3), it is to be noted that expediently, ie. not of necessity but for economic reasons, it be combined with a cooling process within the range of the indicated critical time and temperature intervals.

As regards the material side of the novel supported catalyst (1), in the course of its preparation the presence of water should in general be prevented as far as possible. This requirement starts with the carrier material (1.1.1.1) which, as is customary in industry, should be rigorously dried before use, for example for 8 hours at 140° C. under 20 mm Hg. The alkane (1.1.1.2) which is likewise to be added, n-heptane being particularly suitable, but n-pentane, n-hexane and n-octane also being suitable for example, should ideally contain less than 0.1% by weight of water. The water content of the chromium trioxide (1.1.2.2) should not exceed 1% by weight. We have found that in the case of the alkanol (1.1.3.2), in particular t-butanol, but 2-methyl-2-butanol, 2-methyl-2-pentanol, 3-methyl-3-pentanol and 2,3-dimethyl-2-butanol are also suitable for example, it is likewise possible to tolerate a water content of up to 1% by weight. Finally, the titanium compound (1.1.4.2) is relatively highly sensitive to hydrolysis; for that reason alone it contains minimal amounts of water, if any. Titanium compounds suitable for the purposes of the present invention, in addition to the particularly preferred titanium(IV) tetraisopropylate, also include for example titanium(IV) tetraethylate, titanium(IV) tetrapropylate and titanium(IV) tetrabutylate.

The polymerization process according to the invention employs not only a supported catalyst (1) but also a cocatalyst (2) in the form of a certain alkyllithium. Specific examples of particularly suitable cocatalysts of said type are n-butyllithium, sec.-butyllithium and tert-butyllithium; but it is also possible to use, for example, ethyllithium, n-propyllithium or isopropyllithium.

EXAMPLE

Preparation of supported catalyst (1)

(1.1) In a first stage a catalyst intermediate is prepared by first of all preparing (1.1.1) a suspension in a first substage from (1.1.1.1) a finely divided porous silicate carrier material which possesses a particle diameter of from 30 to 100 μm, a pore volume of 1.75 cm$^3$/g and a surface area of 320 m$^2$/g (dried 8 hours at 140° C. and 20 mm Hg), and (1.1.1.2) anhydrous n-heptane under argon with thorough mixing by stirring, subject to the proviso that, for every 100 parts by weight of carrier material (1.1.1.1), 400 parts by weight of alkane (1.1.1.2) are present, then (1.1.2) in a second substage (1.1.2.1) combining the suspension resulting from substage (1.1.1)

(1.1.2.2) with a finely divided chromium trioxide (CrO$_3$) having a particle diameter of less than 500 μm with continued thorough mixing by stirring, subject to the proviso that, for every 100 parts by weight of carrier material (1.1.1.1), 1 part by weight of chromium is present from the chromium trioxide (1.1.2.2), thereupon (1.1.3) in a third substage (1.1.3.1) combining the suspension obtained from substage (1.1.2) with (1.1.3.2) t-butanol (25° C. warm) with further thorough mixing by stirring at 20° C., subject to the proviso that, for every 100 parts by weight of carrier material (1.1.1.1), 10 parts by weight of alkanol (1.1.3.2) are present, and maintaining the whole at said temperature for 45 minutes, thereafter (1.1.4) in a fourth substage (1.1.4.1) combining the suspension formed in substage (1.1.3) with (1.1.4.2) a titanium compound of the formula Ti(OR)4, where R is isopropyl, with uninterrupted thorough mixing by stirring at 20° C., subject to the proviso that, for every 100 parts by weight of carrier material (1.1.1.1), 4 parts by weight of titanium are present from titanium compound (1.1.4.2), and maintaining the whole at said temperature for 30 minutes, and finally (1.1.5) in a fifth substage evaporating the suspension obtained in substage (1.1.4) to dryness at a temperature of up to 80° C. under reduced pressure (down to 20 mm Hg) in a rotary evaporator.

(1.2) In a second stage the catalyst intermediate obtained from the first stage (1.1) is converted in a fluid bed into the actual supported catalyst by first of all (1.2.1) in a first substage maintaining the catalyst intermediate obtained from the first stage (1.1) at 250° C. in an anhydrous nitrogen stream for 120 minutes, then (1.2.2) in a second substage maintaining the intermediate obtained from substage (1.2.1) at 500° C. in an anhydrous airstream for 60 minutes, and finally (1.2.3) in a third substage maintaining the intermediate obtained from substage (1.2.2) for 60 minutes in an anhydrous nitrogen stream at a temperature dropping from 250° to 100° C.

The supported catalyst thus produced contains 1% by weight of chromium and 4% by weight of titanium.

Polymerization by means of supported catalyst (1) and cocatalyst (2)

A steel autoclave which has 1 liter useful capacity and is equipped with a stirrer is heated to 95° C. and flushed for 10 minutes with dry nitrogen. Thereafter the reactor is charged with 1 ml of a solution containing 10 g of n-butyllithium as cocatalyst (2) per l of n-heptane and with 500 ml of isobutane. By feeding in ethene the pressure is then raised to 40 bar and, after introduction of 80 mg of supported catalyst (1) through a pressure lock to bring the atomic ratio of chromium in supported catalyst:lithium in cocatalyst to 1:10, is maintained during polymerization. After 60 minutes at a polymerization temperature of 95°+2° C. the autoclave is let down with evaporation of isobutane and of unconverted ethene, and the polymer product is removed.

Details of the product can be found in the Table below.

COMPARATIVE EXPERIMENT 1

Preparation of supported catalyst (1)

(1.1) In a first stage a catalyst intermediate is prepared by first of all
(1.1.1) preparing a suspension in a first substage from
(1.1.1.1) a finely divided porous silicate carrier material which possesses a particle diameter of from 30 to 100 μm, a pore volume of 1.75 cm$^3$/g and a surface area of 320 m$^2$/g (dried for 8 hours at 140° C. and 20 mm Hg), and
(1.1.1.2) anhydrous n-heptane under argon with thorough mixing by stirring, subject to the proviso that, for every 100 parts by weight of carrier material (1.1.1.1), 400 parts by weight of alkane (1.1.1.2) are present, then
(1.1.2) in a second substage
(1.1.2.1) combining the suspension formed in substage (1.1.1) with
(1.1.2.2) a titanium compound of the formula Ti(OR)$_4$, where R is isopropyl, with uninterrupted thorough mixing by stirring at 20° C., subject to the proviso that, for every 100 parts by weight of carrier material (1.1.1.1), 4 parts by weight of titanium are present from titanium compound (1.1.2.2), and maintaining the whole at said temperature for 30 minutes, thereupon
(1.1.3) in a third substage evaporating the suspension obtained in substage (1.1.2) to dryness at a temperature of up to 80° C. under reduced pressure (down to 20 mm Hg) in a rotary evaporator, thereafter
(1.1.4) in a fourth substage maintaining the intermediate from substage (1.1.3) in a fluid bed in an anhydrous airstream for 60 minutes at 750° C., subsequently
(1.1.5) in a fifth substage preparing a suspension from
(1.1.5.1) the intermediate formed in substage (1.1.4) and
(1.1.5.2) anhydrous n-heptane under argon with thorough mixing by stirring, subject to the proviso that, for every 100 parts by weight of carrier material (1.1.1.1), 400 parts by weight of alkane (1.1.5.2) are present, hereupon
(1.1.6) in a sixth substage
(1.1.6.1) combining the suspension formed in substage (1.1.5) with
(1.1.6.2) bistert.-butyl chromate with uninterrupted thorough mixing by stirring at 20° C., subject to the proviso that, for every 100 parts by weight of carrier material (1.1.1.1), 1 part by weight of chromium is present from chromium compound (1.1.6.2), and maintaining the whole at said temperature for 30 minutes, and finally
(1.1.7) in a seventh substage evaporating the suspension obtained in substage (1.1.6) to dryness at up to 80° C. under reduced pressure (down to 20 mm Hg) in a rotary evaporator.
(1.2) In a second stage the catalyst intermediate obtained from the first stage (1.1) is converted into the actual supported catalyst by maintaining this intermediate by means of a fluid bed in an anhydrous airstream at 500° C. for 60 minutes.

The supported catalyst thus produced contains 1% by weight of chromium and 4% by weight of titanium.

Polymerization by means of supported catalyst (1) is effected identically to Example.

Details of the product thus obtained can be found in the Table below.

COMPARATIVE EXPERIMENT 2

Preparation of supported catalyst (1)

(1.1) In a first stage a catalyst intermediate is prepared by
(1.1.1) preparing in a first substage a suspension from
(1.1.1.1) a finely divided porous silicate carrier material which possesses a particle diameter of from 30 to 100 μm, a pore volume of 1.75 cm$^3$/g and a surface area of 320 m$^2$/g (dried 8 hours at 140° C. and 20 mm Hg), and
(1.1.1.2) anhydrous n-heptane under argon with thorough mixing by stirring, subject to the proviso that, for every 100 parts by weight of carrier material (1.1.1.1), 400 parts by weight of alkane (1.1.1.2) are present, and
(1.1.2) in a second substage combining
(1.1.2.1) anhydrous heptane,
(1.1.2.2) a titanium compound of the formula Ti(OR)$_4$, where R is isopropyl, and
(1.1.2.3) bistert.-butyl chromate with uninterrupted thorough mixing by stirring at 20° C., subject to the provisos that, for every 100 parts by weight of heptane, a total of 15 parts by weight of titanium compound (1.1.2.2) and of bistert.-butyl chromate (1.1.2.3) are present and the weight ratio of titanium from titanium compound (1.1.2.2) to chromium from chromium compound (1.1.2.3) is 4:1, and heating the whole under reflux for 40 minutes (at about 98° C.), then
(1.1.3) in a third substage
(1.1.3.1) combining the suspension resulting from substage (1.1.1) with
(1.1.3.2) the product obtained from substage (1.1.2) with uninterrupted thorough mixing by stirring at 20° C., subject to the proviso that, for every 100 parts by weight of carrier material (1.1.1.1), 4 parts by weight of titanium are present from titanium compound (1.1.2.2), and maintaining the whole at said temperature for 30 minutes, and finally
(1.1.4) in a fourth substage evaporating the suspension obtained in substage (1.1.3) to dryness at up to 80° C. under reduced pressure (down to 20 mm Hg) in a rotary evaporator.
(1.2) In a second stage the catalyst precursor obtained from the first stage (1.1) is converted into the actual supported catalyst by maintaining this intermediate by means of a fluid bed at 500° C. in an anhydrous airstream for 60 minutes.

The supported catalyst thus produced contains 1% by weight of chromium and 4% by weight of titanium.

Polymerization by means of supported catalyst (1) is effected identically to Example.

Details about the resulting product can be found in the Table below.

COMPARATIVE EXPERIMENT 3

Preparation of supported catalyst (1)

(1.1) In a first stage a catalyst precursor is prepared by first of all (1.1.1) preparing in a first substage a suspension from (1.1.1.1) a finely divided porous silicate carrier material which contains 1% by weight of chromium in the form of chromium trioxide and is obtainable from Grace GmbH under the trade name 969 MS (dried 8 hours at 140° C. and 20 mm Hg), and (1.1.1.2) anhydrous n-heptane under argon with thorough mixing by stirring, subject to the proviso that, for every 100 parts by weight of carrier material (1.1.1.1), 400 parts by weight of alkane (1.1.1.2) are present, then (1.1.2) in a second substage (1.1.2.1) combining the suspension formed in substage (1.1.1) with (1.1.2.2) a titanium compound of the formula Ti(OR)$_4$, where R is isopropyl, with uninterrupted thorough mixing by stirring at 20° C., subject to the proviso that, for every 100 parts by weight of carrier material (1.1.1.1), 4 parts by weight of titanium are present from titanium compound (1.1.2.2), and maintaining the whole at said temperature for 30 minutes, and finally (1.1.3) in a third substage evaporating the suspension obtained in substage (1.1.2) to dryness at up to 80° C. under reduced pressure (down to 20 mm Hg) in a rotary evaporator.

(1.2) In a second stage the catalyst intermediate obtained from the first stage (1.1) is converted into the actual supported catalyst by maintaining this intermediate by means of a fluid bed at 500° C. in an anhydrous airstream for 60 minutes.

The supported catalyst thus produced contains 1% by weight of chromium and 4% by weight of titanium.

Polymerization by means of supported catalyst (1) is effected identically to Example.

Details about the product thus obtained can be found in the Table below.

TABLE

| | Productivity$^{(a)}$ | HLMI$^{(b)}$ (g/10 min) | Mw/Mn$^{(c)}$ | 250 μm$^{(d)}$ % |
|---|---|---|---|---|
| Example | 4,000 | 6.1 | 36.1 | 0.8 |
| Comp. Experiment 1 | 3,700 | 7.9 | 23.0 | 5.0 |
| Comp. Experiment 2 | 2,900 | 7.3 | 22.7 | 3.1 |
| Comp. Experiment 3 | 2,600 | 6.0 | 32.0 | 14.7 |

$^{(a)}$grams of polymer per gram of supported catalyst (1).
$^{(b)}$in accordance with DIN 53,735 at 190° C./21.6 Kp.
$^{(c)}$ratio of weight and number average molecular weight (Mw/Mn), determined by gel permeation chromatography. (Large values of Mw/Mn correspond to a wide molecular weight distribution, and vice versa).
$^{(d)}$particle diameter of polymer as per sieve analysis.

The products obtained in the Comparative Experiments have a narrower molecular weight distribution and contain a distinctly higher amount of dustlike particles than the product prepared according to the invention.

We claim:

1. A process for preparing ethene homopolymers and ethene copolymers with minor amounts of copolymerized $C_3$–$C_{12}$-α-monoalkenes by polymerizing the monomer(s) at from 30° to 150° C. and from 2 to 150 bar by Phillips catalysis using (1) a supported catalyst composed of a carrier material which is loaded with chromium in oxide form and titanium in oxide form and (2) a cocatalyst, the supported catalyst (1) having been obtained by (1.1) preparing in a first stage a catalyst intermediate (1.1) loaded with desired amounts of chromium and titanium from (1.1.a) a finely divided porous silicate carrier material, (1.1.b) a selected, specific chromium compound and (1.1.c) a selected, specific titanium compound and then (1.2) in a second stage maintaining the catalyst intermediate (1.1) obtained in the first stage at from 300° to 900° C. in an anhydrous gas stream which contains oxygen in a concentration of over 10% by volume for from 10 to 1,000 minutes and thereby converting it into the actual supported catalyst (1), which comprises (1) using a supported catalyst obtained by (1.1) preparing in a first stage a catalyst intermediate by first (1.1.1) preparing in a first substage a suspension from (1.1.1.1) a finely divided porous silicate carrier material which has a particle diameter of 1 to 400 μm, a pore volume of from 0.5 to 3 cm$^3$/g and a surface area of from 100 to 1,000 m$^2$/g, and (1.1.1.2) a $C_5$–$C_8$-alkane which is present in liquid form with thorough mixing, subject to the proviso that for every 100 parts by weight of carrier material (1.1.1.1), from 150 to 5,000 parts by weight of alkane (1.1.1.2) are present, then (1.1.2) in a second substage (1.1.2.1) combining the suspension resulting from substage (1.1.1) with (1.1.2.2) a finely divided chromium trioxide ($CrO_3$) having a particle diameter of less than 2,000 Mm with further thorough mixing, subject to the proviso that, for every 100 parts by weight of carrier material (1.1.1.1), from 0.1 to 5 parts by weight of chromium are present from chromium trioxide (1.1.2.2), thereupon (1.1.3) in a third substage (1.1.3.1) combining the suspension obtained from substage (1.1.2) with (1.1.3.2) a $C_3$14 $C_{10}$-alkanol with continued thorough mixing at from 0° to 60° C., subject to the proviso that, for every 100 parts by weight of carrier material (1.1.1.1), from 3 to 30 parts by weight of alkanol (1.1.3.2) are present, and maintaining the whole at said temperature for from 10 to 300 minutes, thereafter (1.1.4) in a fourth substage (1.1.4.1) combining the suspension formed in substage (1.1.3) with (1.1.4.2) a titanium compound of the formula Ti(OR)$_4$, where R is $C_1$–$C_{12}$-alkyl, aryl or cycloalkyl, with uninterrupted thorough mixing at from 0 to 60° C., subject to the proviso that, for every 100 parts by weight of carrier material (1.1.1.1), from 0.1 to 10 parts by weight of titanium are present from titanium compound (1.1.4.2), and maintaining the whole at said temperature for from 5 to 300 minutes, finally (1.1.5) in a fifth substage evaporating the suspension obtained in substage (1.1.4) to dryness at not more than 150° C. with or without reduced pressure, and then (1.2) in a second stage converting the catalyst intermediate obtained from the first stage (1.1) into the actual supported catalyst by first (1.2.1) in a first substage maintaining the catalyst intermediate obtained from the first stage (1.1) at from 150° to 300° C. in an anhydrous nitrogen stream for from 60 to 500 minutes, thereupon (1.2.2) in a second substage maintaining the intermediate obtained from substage (1.2.1) at from 300° to 900° C. in an anhydrous gas stream which contains oxygen in a concentration of over 10% by volume for from 10 to 1,000 minutes, and finally (1.2.3) in a third substage maintaining the intermediate from substage (1.2.2) at from 50° to 400° C. in an anhydrous nitrogen stream for from 10 to 300 minutes, and (2) using as cocatalyst an alkyllithium of the formula $LiR^1$, where $R^1$ is $C_1-C12$-alkyl, subject to the proviso that the atomic ratio of chromium in supported catalyst (1):lithium in cocatalyst (2) is greater than 1:100.

* * * * *

UNITED STATES PATENT AND TRADEMARK OFFICE
CERTIFICATE OF CORRECTION

PATENT NO. : 4,728,703
DATED : March 1, 1988
INVENTOR(S) : Rainer KONRAD et al.

It is certified that error appears in the above-identified patent and that said Letters Patent is hereby corrected as shown below:

Column 10, line 53 a $C_3[4]C_{10}$-alkanol should be:

a $\underline{C_3-C_{10}}$-alkanol .

Signed and Sealed this

Twenty-eighth Day of June, 1988

*Attest:*

DONALD J. QUIGG

*Attesting Officer*     *Commissioner of Patents and Trademarks*